M. K. HOLMES.
GLASS WORKING MACHINE.
APPLICATION FILED MAR. 17, 1913.

1,193,787.

Patented Aug. 8, 1916.
4 SHEETS—SHEET 2.

Witnesses
Frank A. Fahle
Josephine Gasper

Inventor
Minot K. Holmes,
By Arthur M. Hood
Attorney

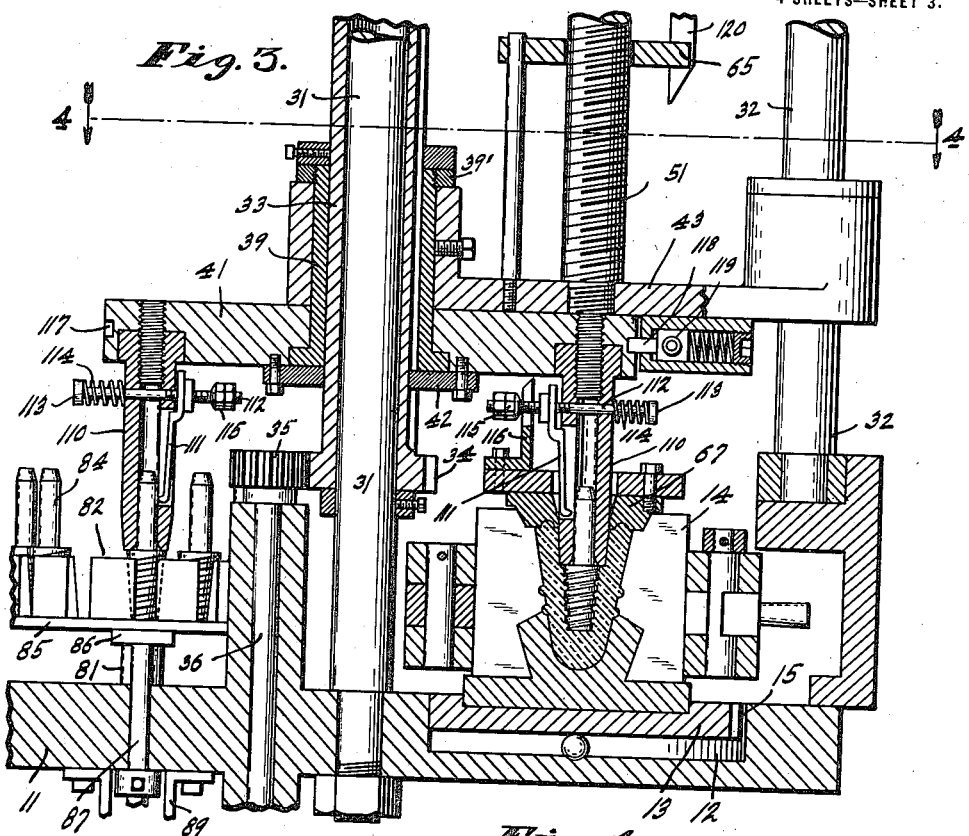

M. K. HOLMES.
GLASS WORKING MACHINE.
APPLICATION FILED MAR. 17, 1913.
1,193,787.
Patented Aug. 8, 1916.
4 SHEETS—SHEET 4.
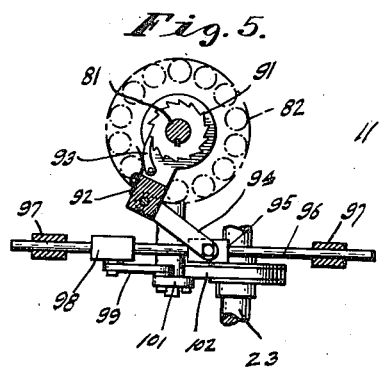
Fig. 5.
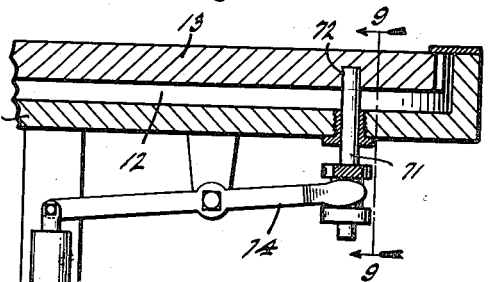
Fig. 8.
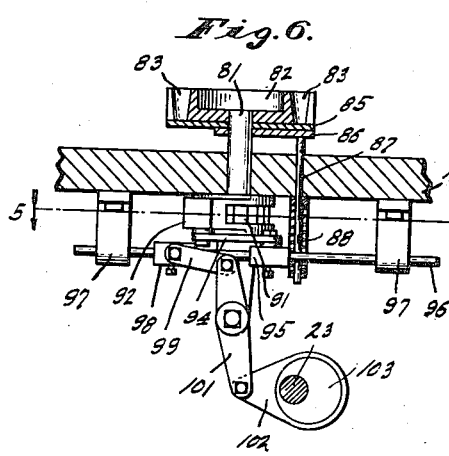
Fig. 6.
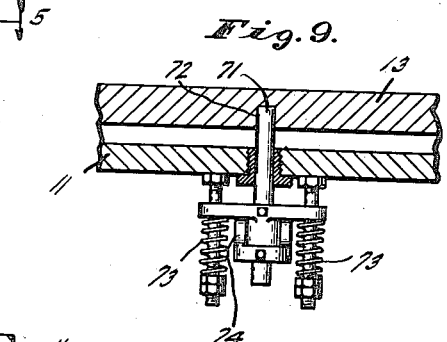
Fig. 9.
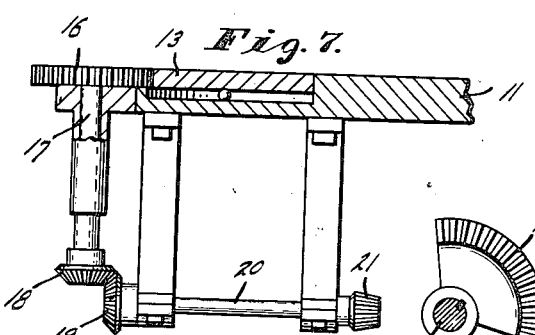
Fig. 7.
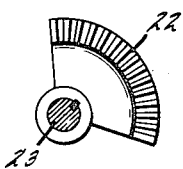
Witnesses
Frank A. Fahle
Josephine Gasper
Inventor
Minot K. Holmes,
By Arthur M. Hood
Attorney

UNITED STATES PATENT OFFICE.

MINOT K. HOLMES, OF MUNCIE, INDIANA, ASSIGNOR TO HEMINGRAY GLASS COMPANY, OF MUNCIE, INDIANA, A CORPORATION OF KENTUCKY.

GLASS-WORKING MACHINE.

1,193,787.

Specification of Letters Patent.  Patented Aug. 8, 1916.

Application filed March 17, 1913. Serial No. 754,771.

*To all whom it may concern:*

Be it known that I, MINOT K. HOLMES, a citizen of the United States, residing at Muncie, in the county of Delaware and State of Indiana, have invented a new and useful Glass-Working Machine, of which the following is a specification.

The object of my invention is to produce a glass working machine for the production of pressed glass articles in which a portion of the pressing member is allowed to remain within the glass for more or less of a period subsequent to the withdrawal of the mechanism by which it was associated with the molten glass.

The accompanying drawings illustrate my invention.

Figure 1:
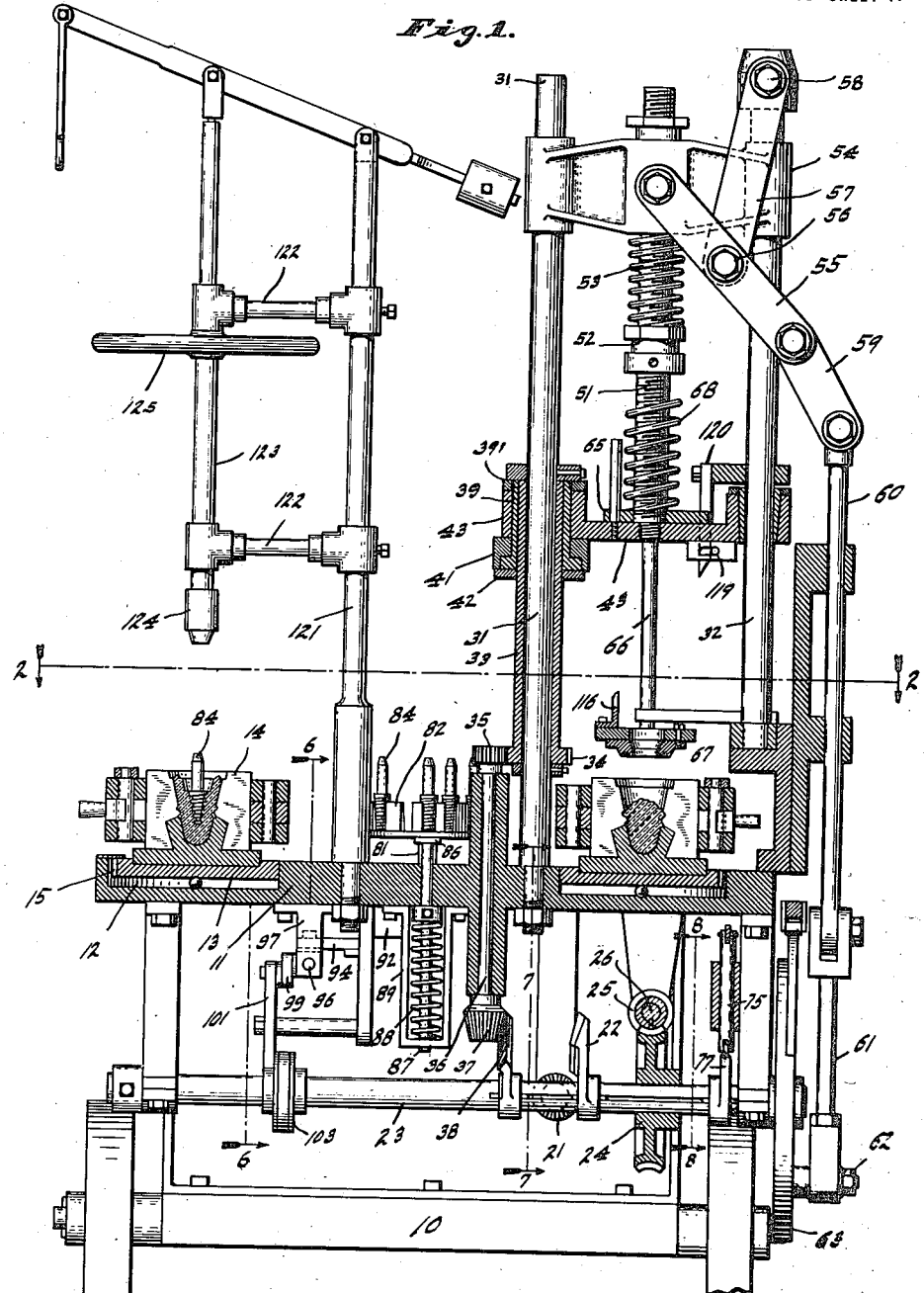
Figure 2:
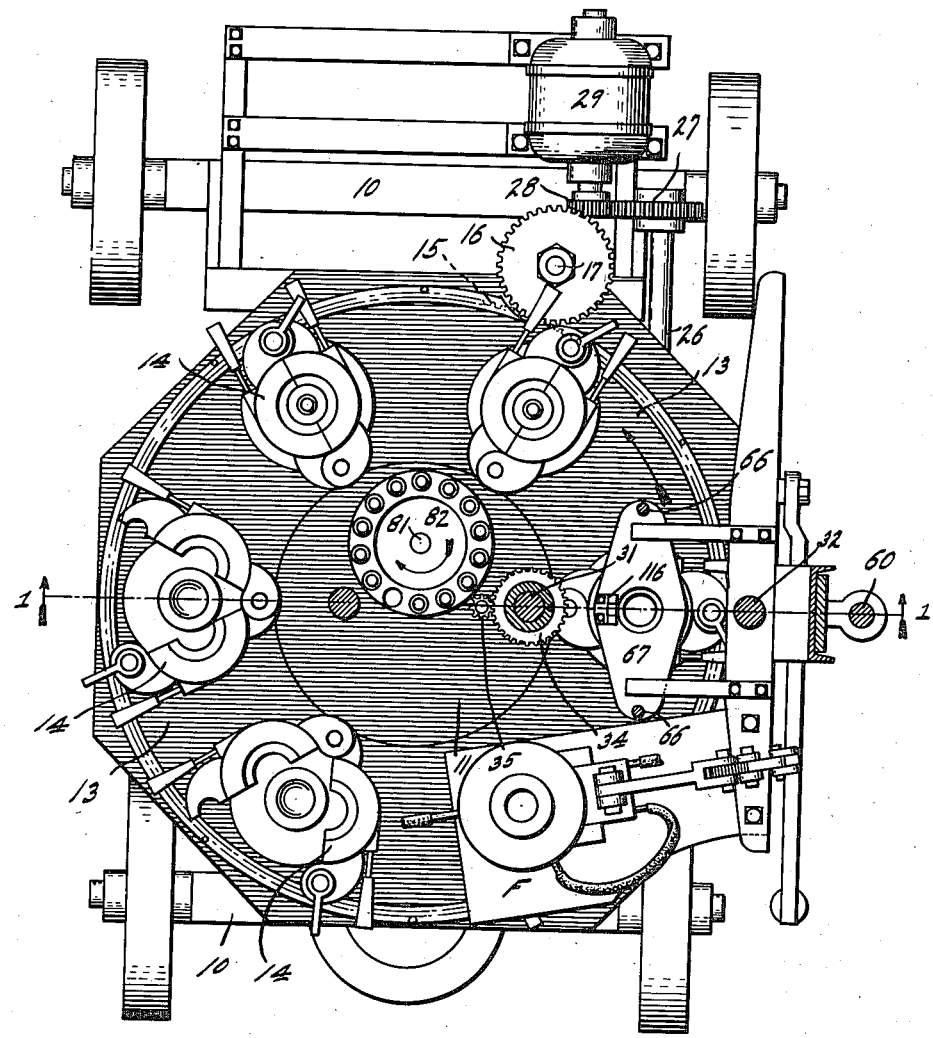

Figure 1 is a central vertical section (on line 1—1 of Fig. 2) of a machine embodying my invention and especially designed for the production of glass insulators of a well known type, said machine being of the general type disclosed in Patent No. 909,595. Fig. 2 is a horizontal section on line 2—2 of Fig. 1; Fig. 3 is an enlarged vertical section on the line 3—3 of Fig. 4, showing the press plunger in glass-forming position and in stud receiving position; Fig. 4 a fragmentary section on the line 4—4 of Fig. 3; Fig. 5 a sectional detail on line 5—5 of Fig. 6 of the mechanism for advancing the stud magazine; Fig. 6 is an elevation of parts shown in Fig. 5, the supporting table and the magazine being shown in vertical section said section being taken on line 6—6 of Fig. 1, the magazine, however, being shown in vertical section; Fig. 7 a fragmentary detail on line 7—7 of Fig. 1 of the mold table-driving train; Fig. 8 a fragmentary vertical section on line 8—8 of Fig. 1 of the mold table lock; Fig. 9 a section on the line 9—9 of Fig. 8.

In the drawings, 10 indicates a supporting carriage of the usual form carrying a supporting table 11 in the upper face of which is formed an annular groove 12 in which is rotatably mounted an annular mold-carrying table 13 upon which molds 14 of any type are mounted. The mold table 13 is intermittently advanced step-by-step, in the direction indicated by the arrow in Fig. 2, by any suitable means. In the structure shown in the drawings the annular table 13 is provided with gear teeth 15 on its outer periphery engaged by a gear wheel 16 carried upon the upper end of the shaft 17 to the lower end of which is attached a bevel pinion 18 meshed with a similar pinion 19 upon one end of a shaft 20 having a pinion 21 at its opposite end, and this pinion 21 is in the path of movement of a segmental gear 22 carried by the main driving shaft 23, the parts being so proportioned that each complete revolution of the main driving shaft 23 will produce one advancement of the mold-carrying table, in the usual manner. Shaft 23 is continuously driven by any suitable means such as worm wheel 24 and worm 25, said worm 25 being carried by a shaft 26 connected by gears 27 and 28 with a motor 29 mounted upon carriage 10.

Extending upwardly from table 11 are two guide rods 31 and 32. Journaled upon rod 31 is a hollow shaft 33 provided with a gear 34 at its lower end and this gear meshes with a pinion 35 carried by the upper end of a shaft 36 which is journaled in table 11 and is provided at its lower end with a bevel pinion 37 arranged in the path of movement of a segmental gear 38 mounted on the shaft 23. Mounted upon the hollow shaft 33 is a sleeve 39 upon which is journaled a transfer arm 41 and this transfer arm is splined on the sleeve 33 by means of a plate 42 attached to the under side of arm 41 and holding it in place upon sleeve 39. The sleeve 39 projects upwardly through one end of the plunger head 43 and at its upper end is threaded to receive a collar 39′ which will engage the plunger head and thus permit the transfer arm 41 to be adjusted so as to lie closely against the under side of the plunger head. The opposite end of the plunger head is bored to receive the post 32 so that the post 32 thus becomes a vertical guide for the vertical movement of the plunger head.

The plunger head may be reciprocated by any desired means. In the drawings it is shown as provided with an upwardly projecting threaded stem 51 which is firmly secured to the head 43 at its middle. Adjustably mounted upon the stem 51 is a nut 52 which serves as an abutment for a spring 53 which is interposed between the nut 52 and an operating cross head 54 slidably mounted upon the guide rods 31 and 32. Head 54 is reciprocated through a uniform stroke by means of a lever 55 pivoted at 56 on the lower end of a link 57 pivoted at 58 upon the upper end of rod 32. Connected to lever 55 is a link 59 which is connected to the upper end of a piston rod 60. Piston 60 is reciprocated by means of a pitman rod 61 carried by a crank pin 62 of a disk 63 carried by shaft 23. Slidably mounted upon the lower end of stem 51 is a plate 65 which projects beyond the sides of plunger head 43 and carries at each end a depending rod 66. At the lower ends of the two rods 66 is secured a ring plate 67 formed to close the upper ends of the molds 14. Arranged between plate 65 and nut 52, in a well known manner, is a spring 68 by means of which the ring plate 67 will be held evenly in place upon the molds.

It is desirable to lock the mold-carrying table in its successive positions during the pressing action and for this purpose I provide a locking pin 71 yieldingly urged upwardly into table-engaging position, in properly formed holes 72 formed in the lower face of the mold table, by springs 73. For the purpose of retracting locking pin 71 I provide a lever 74 which is operated by means of a plunger 75 carrying a roller 76 at its lower end engaging a cam 77 on shaft 23.

Journaled in table 11 is a shaft 81 which carries at its upper end, a magazine 82 provided with a circular series of pockets 83 within which studs 84, to be introduced into molten glass, may be mounted. In the machine shown in the present drawings this magazine is formed to receive studs 84 which are threaded at their lower ends so as to form the desired threads in the interior of common glass insulators. It is desirable that the studs 84 be capable of some downward yielding within the magazine and for that purpose the lower ends of the pockets 83 are closed by a plate 85 which is slidably mounted upon shaft 81 and is normally held upwardly against the bottom of the magazine by a plate 86 and pin 87 which pin is yieldingly urged upwardly by a spring 88 carried in a yoke 89 secured to the under face of table 11. In order to advance the magazine 82 step-by-step, I secure to the lower end of shaft 81 a ratchet wheel 91 provided with as many teeth as there are pockets 83. Pivoted upon shaft 81 is a pawl-carrying arm 92 provided with a pawl 93 arranged to engage the teeth of ratchet 91. Arm 92 is reciprocated by means of a link 94 attached to a block 95 adjustably mounted upon a rod 96 slidably mounted in brackets 97. Secured to rod 96 is a block 98 to which one end of a link 99 is pivoted, the opposite end of said link being pivoted to one end of a lever 101, and the opposite end of this lever is pivoted to an arm 102 mounted upon an eccentric 103 carried by shaft 23.

The particular details by means of which the mold carrying table, the magazine, and the presser head are operated in proper time with relation to each other, is not at all material to my present invention and it will be readily understood that these various details may be quite radically changed without departing from the essence of my invention which resides primarily in the provision of the transfer arm 41 mounted upon the presser head 43.

The transfer arm 41 is conveniently double headed so that each vertical reciprocation of this arm may result in proper coaction with a mold, and therefore I mount upon each end of this arm 41 a depending stem 110 the lower end of which is preferably formed to serve as a glass-forming plunger. This stem is therefore formed for projection through the ring 67 and the normal distance between the upper face of this ring 67 and the lower face of the presser head 43 is sufficient to permit the stem 110, together with anything which it may carry at its lower end, to swing between these two plates. Stem 110 is hollow so as to receive the upper end of any one of the studs 84 and in order to yieldingly hold the stud 84 within the stem 110 I provide a yielding gripping finger 111 adapted to engage the stem of a stud 84. Finger 111 is adjustably mounted upon a rod 112 which is carried by, and lies transversely to, the stem 110. Rod 112 is provided at one end with a head 113. Beneath this head I arrange a spring 114 normally urging finger 111 toward the axis of stem 110. Adjustably mounted upon the opposite end of rod 112 is a button 115 which may be so arranged as to be engaged by the beveled upper end of a fork 116, carried by plate 67, in such manner that, when the parts are in the position shown in Fig. 3, finger 111 will be withdrawn from the stem of stud 84. It will be readily understood that arm 41 may be multi-ended with each end, provided with a stem 110, in which case its rotative advancement each time would be determined by the distance between its ends.

In order that the transfer arm 41 may not move beyond its proper position when it is advanced by the rotation of the tubular shaft 33, I form in each end of this arm a notch 117 adapted to receive a spring latch 118. This latch 118 is provided with a pair of oppositely projecting pins 119 (Fig. 4) which, when the presser head 43 is moved upwardly, are engaged by stationary fingers 120 which act upon the pins to withdraw latch 118 from the transfer arm 41.

In operation, molten glass is deposited within the molds at points F (Fig. 2) by any suitable means and magazine 82 is filled or partially filled with the desired number of studs 84. By vertical reciprocation of the presser head 43 one of the stems 110 will be brought down upon the upwardly projecting end of one of the studs 84 and, when the presser head rises, this stud will be withdrawn from the magazine. As the presser head 43 rises, plate 67 will remain in position upon a mold until the presser head engages the plate 65. At about this time the segment 38 will come into mesh with pinion 37 thus rotating shaft 36 and the hollow shaft 33, giving said shaft 33 half rotation and bringing the stem 110, into which a stud 84 has been inserted, directly beneath the presser head 43, at which time latch 118 engages the transfer arm 41 to hold it in place. At about the same time segment 22 will engage pinion 21 and operate to rotate gear 16 and advance the mold table one step. At about the same time eccentric 103 will cause a movement of the parts connected to it in such manner as to swing the arm 92 and advance the magazine 82 one step. Thereupon, the freshly filled mold having been brought beneath the plunger by the advancement of the table, the presser head 43 will be again reciprocated and the new stem 110 with the stud which it contains at its lower end, will be projected downwardly, ring 67 moving into position at the upper end of the mold and then the presser head continuing in its downward movement so as to project the stud 84 and the pin 110 through ring 67. Just before this downward movement is completed, the opposite stem 110 embraces a new stud 84 and the fork 116 engages the button 115 of the rod 112 of the stem 110 so as to retract finger 111 from the stud 84 which is within the molten glass so that, when the presser head again moves upwardly, the stud 84, which has just been projected into the glass, remains in the glass and is carried away with the completed article when the mold table is again advanced.

Any suitable means may be provided for extracting the studs 84 if they are to be extracted. Table 11 may carry a mast or standard 121 provided with cross arms 122 in which is mounted a shaft 123 capable of rotation and vertical reciprocation. Shaft 123 carries a chuck 124 at its lower end formed to receive the exposed stem of stud 84 and also carries a hand wheel 125 by means of which the shaft, and consequently the stud, may be rotated so as to unscrew the stud from the glass which, by this time, has hardened.

I claim as my invention:

1. In a glass working machine, the combination of a series of molds, means for bringing said molds successively to pressing position, a stud magazine, means for bringing said magazine to successive delivery positions, a presser head arranged to coact with the molds when they are brought successively to pressing position, a transfer arm rotatably mounted upon the presser head, means carried by the ends of said transfer arm for engaging and retaining a stud from the magazine, and means for intermittently shifting the transfer arm to bring its stud engaging means alternately into alinement with a portion of the magazine and a mold upon the mold table, and means associated with the presser head for releasing the stud-retaining means.

2. In a glass working machine, the combination of a series of molds, means for bringing said molds successively to pressing position, a stud magazine, means for bringing said magazine to successive delivery positions, a presser head arranged to coact with the molds when they are brought successively to pressing position, a transfer arm mounted upon the presser head, means carried by said transfer arm for engaging and retaining a stud from the magazine, and means for intermittently shifting the transfer arm to bring its stud engaging means alternately into alinement with a portion of the magazine and a mold upon the mold table, and means associated with the presser head for releasing the stud-retaining means.

3. In a glass working machine, the combination of a series of molds, means for bringing said molds successively to pressing position, a stud magazine, means for bringing said magazine to successive delivery positions, a presser head arranged to coact with the molds when they are brought successively to pressing position, a transfer arm rotatably mounted upon the presser head, means carried by the ends of said transfer arm for engaging and retaining a stud from the magazine, and means for intermittently shifting the transfer arm to bring its stud engaging means alternately into alinement with a portion of the magazine and a mold upon the mold table, said stud-engaging means being then in substantial alinement with the line of action upon the presser head.

4. In a glass working machine, the combination of a series of molds, means for bringing said molds successively to pressing position, a stud magazine, means for bringing said magazine to successive delivery positions, a presser head arranged to coact with the molds when they are brought successively to pressing position, a transfer arm mounted upon the presser head, means carried by said transfer arm for engaging and retaining a stud from the magazine, and means for intermittently shifting the transfer arm to bring its stud engaging means alternately into alinement with a portion of the magazine and a mold upon the mold table, said stud-engaging means being then in substantial alinement with the line of action upon the presser head.

5. In a glass working machine, the combination of a series of molds, means for bringing said molds successively to pressing position, a stud magazine, means for advancing said stud magazine step-by-step, a guide rod arranged adjacent the mold carrying means, a tubular shaft journaled upon said guide rod, means for intermittently rotating said tubular shaft upon said rod, a presser head reciprocably mounted upon said tubular shaft, a transfer arm carried by said presser head and splined upon said tubular shaft, means carried by said transfer arm for engaging and retaining studs presented by the magazine, and means carried by the presser head for withdrawing the stud-retaining means.

6. In a glass working machine, the combination of a series of molds, means for bringing said molds successively to pressing position, a stud magazine, means for advancing said stud magazine step-by-step, a guide rod arranged adjacent the mold carrying means, a tubular shaft journaled upon said guide rod, means for intermittently rotating said tubular shaft upon said rod, a presser head reciprocably mounted upon said tubular shaft, a transfer arm carried by said presser head and splined upon said tubular shaft, means carried by said transfer arm for engaging and retaining studs presented by the magazine.

In witness whereof, I, have hereunto set my hand at Indianapolis, Indiana, this 13th day of March, A. D. one thousand nine hundred and thirteen.

MINOT K. HOLMES.

Witnesses:
    FRANK A. FAHLE,
    JOSEPHINE GASPER.